United States Patent
Mokheimer et al.

(10) Patent No.: US 9,845,667 B2
(45) Date of Patent: Dec. 19, 2017

(54) HYBRID SOLAR THERMAL ENHANCED OIL RECOVERY SYSTEM WITH OXY-FUEL COMBUSTOR

(71) Applicant: KING FAHD UNIVERSITY OF PETROLEUM AND MINERALS, Dhahran (SA)

(72) Inventors: Esmail Mohamed Ali Mokheimer, Dhahran (SA); Mohamed Abdel-Aziz Mostafa Habib, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 350 days.

(21) Appl. No.: 14/795,791

(22) Filed: Jul. 9, 2015

(65) Prior Publication Data
US 2017/0009561 A1    Jan. 12, 2017

(51) Int. Cl.
| | |
|---|---|
| *E21B 43/24* | (2006.01) |
| *E21B 43/16* | (2006.01) |
| *E21B 43/40* | (2006.01) |
| *B01D 17/02* | (2006.01) |
| *F24J 2/42* | (2006.01) |

(52) U.S. Cl.
CPC .......... *E21B 43/24* (2013.01); *B01D 17/0205* (2013.01); *E21B 43/164* (2013.01); *E21B 43/40* (2013.01); *F24J 2/42* (2013.01)

(58) Field of Classification Search
CPC ........ E21B 43/24; E21B 43/164; E21B 43/40; F24J 2/42; F24J 2/04; B01D 17/0205
See application file for complete search history.

(56) References Cited

U.S. PATENT DOCUMENTS

| | | | |
|---|---|---|---|
| 6,233,914 B1 * | 5/2001 | Fisher | F01K 23/10 60/39.12 |
| 6,910,335 B2 | 6/2005 | Viteri et al. | |
| 8,117,822 B2 | 2/2012 | Habib et al. | |
| 8,167,041 B2 * | 5/2012 | Chiesa | E21B 43/24 126/688 |
| 8,169,101 B2 * | 5/2012 | Hinders | F24J 3/085 290/52 |
| 8,701,773 B2 | 4/2014 | O'Donnell et al. | |
| 8,739,774 B2 | 6/2014 | O'Donnell et al. | |
| 8,893,505 B2 * | 11/2014 | Mokheimer | F02C 1/05 60/39.12 |
| 9,200,799 B2 * | 12/2015 | O'Donnell | E21B 43/24 |

(Continued)

FOREIGN PATENT DOCUMENTS

EP    2 589 765 A1    5/2013

*Primary Examiner* — Michael Wills, III
(74) *Attorney, Agent, or Firm* — Richard C. Litman

(57) ABSTRACT

The hybrid solar thermal enhanced oil recovery system with an oxy-fuel combustor is an enhanced oil recovery system utilizing solar thermal enhanced oil recovery during the daytime and utilizing an oxy-fuel combustor in the nighttime. A solar heater is used for the solar thermal enhanced oil recovery, generating steam injected into an oil field having an oil well for enhanced oil recovery. During the nighttime, when solar heating is not available, an oxy-fuel combustor produces carbon dioxide and nitrogen. The carbon dioxide is injected into the oil field for miscible enhanced oil recovery and the nitrogen is separately injected into the oil field for immiscible enhanced oil recovery.

20 Claims, 2 Drawing Sheets

(56) References Cited

U.S. PATENT DOCUMENTS

| | | | |
|---|---|---|---|
| 9,243,482 B2* | 1/2016 | Rop | E21B 43/24 |
| 2005/0279500 A1* | 12/2005 | Heins | C02F 1/04 |
| | | | 166/266 |
| 2006/0048770 A1* | 3/2006 | Meksvanh | E21B 41/0057 |
| | | | 126/620 |
| 2007/0056726 A1* | 3/2007 | Shurtleff | E21B 43/305 |
| | | | 166/245 |
| 2008/0116694 A1* | 5/2008 | Hendershot | F01K 13/00 |
| | | | 290/1 R |
| 2011/0041740 A1* | 2/2011 | Reilly | F23C 9/00 |
| | | | 110/341 |
| 2011/0277469 A1* | 11/2011 | Brenmiller | F03G 6/067 |
| | | | 60/641.8 |
| 2013/0105151 A1 | 5/2013 | Rop | |
| 2013/0199425 A1 | 8/2013 | Ghoniem et al. | |
| 2014/0190469 A1 | 7/2014 | O'Donnell et al. | |
| 2014/0216717 A1 | 8/2014 | O'Donnell et al. | |
| 2014/0318792 A1 | 10/2014 | Chen et al. | |

* cited by examiner

HYBRID SOLAR THERMAL ENHANCED OIL RECOVERY SYSTEM WITH OXY-FUEL COMBUSTOR

BACKGROUND OF THE INVENTION

1. Field of the Invention

The present invention relates to enhanced oil recovery systems, and particularly to a hybrid solar thermal enhanced oil recovery system with oxy-fuel combustor that uses solar thermal enhanced oil recovery in the daytime and uses an oxy-fuel combustor for fluid injection in the nighttime.

2. Description of the Related Art

Solar thermal enhanced oil recovery is a form of thermal enhanced oil recovery (EOR), a technique that is applied by oil producers to extract more oil from maturing oil fields. Solar EOR uses solar arrays to concentrate the sun's energy to heat water and generate steam. The steam is injected into an oil reservoir to reduce the viscosity and thin heavy crude oil, thus facilitating its flow to the surface. Thermal recovery processes, also known as "steam injection", have traditionally burned natural gas to produce steam, generating environmental concerns due to the related carbon dioxide emissions. Solar EOR has recently proved to be a viable alternative to gas-fired steam production for the oil industry. Solar EOR can generate the same quality steam as natural gas, reaching temperatures up to 400° C. and 2,500 PSI.

FIG. 2 illustrates a typical prior art solar thermal enhanced oil recovery system 100, including an oil field 102, a solar power tower 104, a boiler 106, and a flow control device 108. The oil field 102 includes an oil well 110, a steam pipe 116, and an oil and water pipe 122. The system 100 further includes an oil and water separator 126, a water treatment device 112, and a feed pump 114.

In operation, the oil field 102 receives steam 118 from the flow control device 108. The steam 118 is injected into the oil well 110 of the oil field 102 through the steam pipe 116, where the steam 118 is used for extracting crude oil 120 from geologic formations 121. The injected steam 118 increases the mobility of crude oil 120 within the geologic formations 121 and eventually condenses to form a mixture of oil and water 124. The mixture of oil and water 124 is influenced by the steam and migrates towards the oil and water pipe 122, through which it is extracted from the oil field 102. Further, the mixture of oil and water 124 is fed to the oil and water separator 126 for separating extracted oil 128 from the mixture of oil and water 124, producing untreated water 129. The water treatment device 112 receives the untreated water 129 from the oil and water separator 126, where the water treatment device 112 purifies the untreated water 129 to obtain treated water 130. The treated water 130 has a low percentage of solids, sludge and salts. A first portion 130a of the treated water 130 is fed to the solar power tower 104 via a feed pump 114, and a second portion 130b of the treated water 130 is fed to the boiler 106 via the feed pump 114.

The first portion 130a of the treated water 130, which is fed to the solar power tower 104, is heated thereby, using solar radiation, thus generating a first source of steam 118a. Similarly, the second portion 130b of the treated water 130 is fed to the boiler 106 where the boiler 106 is used to heat the second portion 130b of the treated water 130 using external energy, thus generating second source of steam 118b. The flow control device 108 receives at least one of the first steam 118a from the solar power tower 104 and the second steam 118b from the boiler 106. Further, the flow control device 108 injects the received first steam 118a and the second steam 118b to the oil well 110 of the oil field 102 for extracting the mixture of oil and water 124. One such typical prior art system is shown in U.S. Patent Application Publication No. 2014/0318792, which is hereby incorporated by reference in its entirety. Such systems, however, not only require a great deal of natural gas and water to operate, but are also considerable sources of pollution and contamination for the environment, as well as being inefficient for carbon dioxide-based enhanced oil recovery. Specifically, such systems make use of conventional combustion, which emits carbon dioxide in such a way that it is difficult to separate the carbon dioxide from the nitrogen in the system, thus making it difficult to use the carbon dioxide for enhanced oil recovery. Further, such systems also emit nitrogen oxides into the environment, which are a major source of pollution.

Thus, a hybrid solar thermal enhanced oil recovery system with an oxy-fuel combustor addressing the aforementioned problems is desired.

SUMMARY OF THE INVENTION

The hybrid solar thermal enhanced oil recovery system with an oxy-fuel combustor is an enhanced oil recovery system utilizing solar thermal enhanced oil recovery during the daytime and utilizing an oxy-fuel combustor in the nighttime. A solar heater is used for the solar thermal enhanced oil recovery, generating steam for injection into an oil field having an oil well for enhanced oil recovery. During the nighttime, when solar heating is not available, an oxy-fuel combustor produces carbon dioxide and nitrogen. The carbon dioxide is injected into the oil field for miscible enhanced oil recovery, and the nitrogen is separately injected into the oil field for immiscible enhanced oil recovery.

The present system includes a solar heater for receiving a first portion of production water and producing steam therefrom. A steam pipe is in fluid communication with the solar heater for receiving and injecting the steam into an oil field having an oil well. An oil and water pipe outputs a mixture of oil and water from the oil well, the output oil being the desired crude oil product. An oil and water separator is in communication with the oil and water pipe for separating the crude oil and the production water from the mixture of oil and water. The oil and water separator is in further communication with the solar heater for recycling the first portion of the production water thereto.

An oxy-fuel combustor is provided for nighttime use. The oxy-fuel combustor, which preferably utilizes an ionic transport membrane, receives hydrocarbon fuel and pre-heated air. The combustion thereof produces heated carbon dioxide gas and combustion product water. An air compressor receives ambient air and outputs compressed air, which is fed to a first heat exchanger along with the heated carbon dioxide gas and the combustion product water, thus producing the pre-heated air for the oxy-fuel combustor, and further outputting cooled carbon dioxide gas and cooled water.

A water and gas separator separates the cooled carbon dioxide gas and the cooled water, and a carbon dioxide pipe is in fluid communication with the water and gas separator for injecting the cooled carbon dioxide into the oil field. Additionally, a second heat exchanger is in fluid communication with the oxy-fuel combustor and the water and gas separator for receiving heated nitrogen gas and the cooled water. A nitrogen pipe is in communication with the second heat exchanger for receiving output nitrogen gas therefrom and injecting the output nitrogen gas into the oil field.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
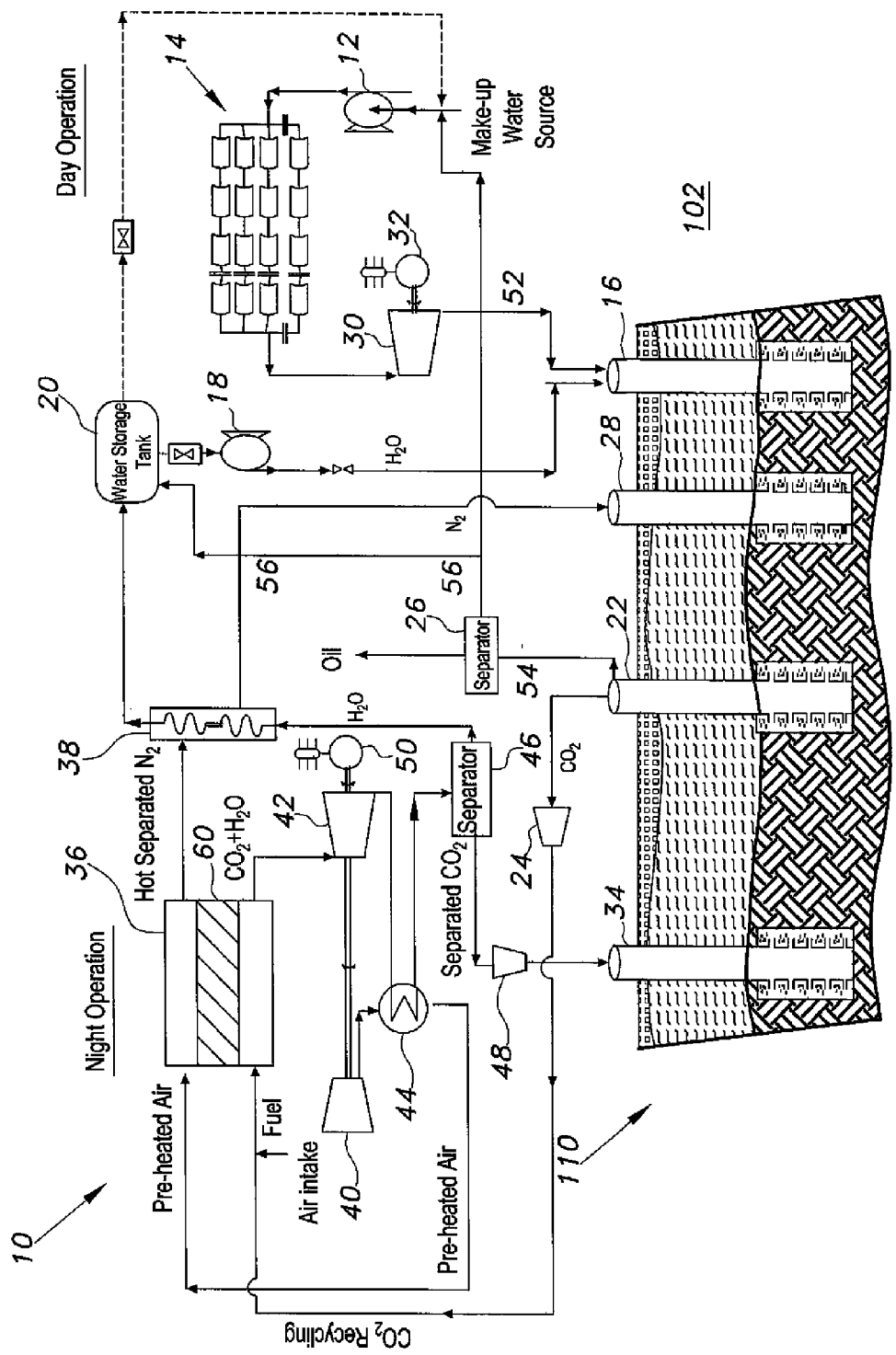
FIG. 1 is a schematic diagram of a hybrid solar thermal enhanced oil recovery system with an oxy-fuel combustor according to the present invention.
Figure 2:
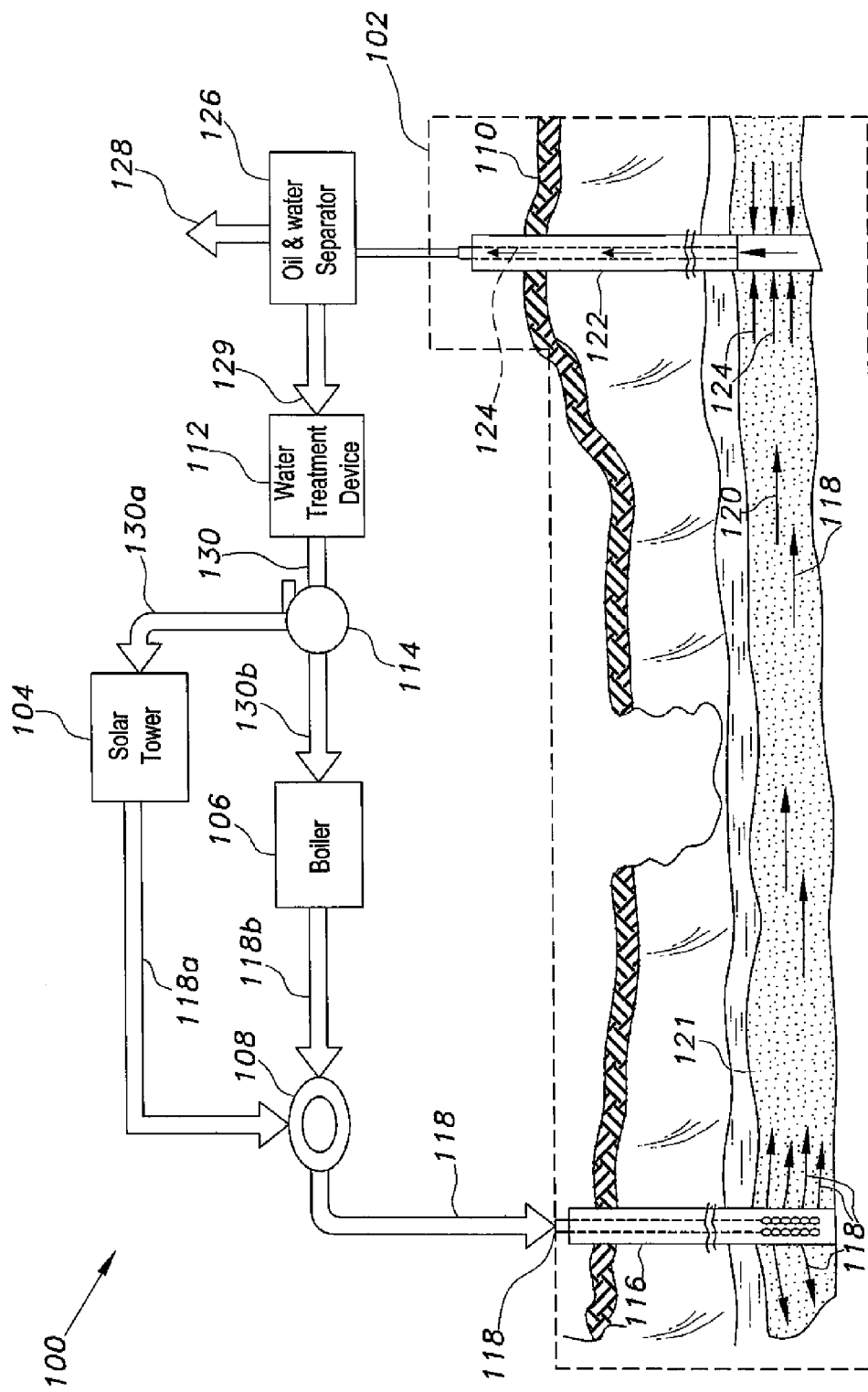
FIG. 2 is a schematic diagram of a solar thermal enhanced oil recovery system according to the prior art.

As shown in FIG. 1, the hybrid solar thermal enhanced oil recovery system with oxy-fuel combustor, the system being designated generally as 10 in the drawings, includes separate portions for both daytime and nighttime operation. The daytime operation portion is similar to system 100 of FIG. 2, where the oil field 102 receives steam 52 injected into the oil well of the oil field 102 through the steam pipe 16, and where the steam 52 is used for extracting crude oil from the geologic formations. As described above, the injected steam 52 increases the mobility of the crude oil within the geologic formations and eventually condenses to form a mixture of oil and water 54. The mixture of oil and water 54 is influenced by the steam and migrates towards the oil and water pipe 22, through which it is extracted from the oil field 102. Further, the mixture of oil and water 54 is fed to the oil and water separator 26 for separating oil from the mixture 124, producing both the oil, which is the end product, and water 56. The water 56 is then filtered and fed back to be mixed with the make-up water source for production of new steam during the day, or is fed into water storage tank 20. The make-up water is fed into a solar collector 14 via a pump 12, where the water is heated to produce steam 52. In the present system 10, the water stored in the storage tank 20, as well as the water that comes directly from the separator 26, serves as the production water in the injection system. As the volumes of production water being produced are never sufficient to replace all the production volumes (i.e., oil and gas, in addition to water), additional "make-up" water is provided from an external source of water.

In FIG. 1, the solar collector 14 is shown as an array of parabolic trough solar heaters, although it should be understood that any suitable type of solar heater or solar heating system may be utilized, such as Fresnel solar collectors or the like. Such solar heating systems for producing steam are well known in the art. One such system is shown in U.S. Pat. No. 8,893,505, which is hereby incorporated by reference in its entirety. As shown, prior to injection through the steam pipe 16, the steam 52 may pass through a turbine 30, which is in connection with a generator 32 driven by the turbine 30 for production of electricity. Hot water (indicated as $H_2O$ in FIG. 1) may also be injected, along with steam 52, via extraction from the water storage tank 20 by a pump 18.

The nighttime portion (or for operation when cloudy) of the hybrid system 10 makes use of an oxy-fuel combustor 36 to generate the required heat when solar power is not sufficient to generate the steam required for injection. The oxy-fuel combustor 36 includes an ion transport membrane 60 that separates oxygen from the air. As shown, pre-heated air is fed into a feed side of the combustor 36, and the ion transport membrane 36 separates oxygen out of the air for combustion with hydrocarbon fuel, which is fed into a permeate side of the combustor 36. This results in the production of carbon dioxide ($CO_2$) and water via conventional hydrocarbon combustion. Such combustors using ion transport membranes are well known in the art. Examples of such combustors are shown in U.S. Pat. No. 8,117,822 and U.S. Patent Application Publication No. 2013/0199425, each of which is hereby incorporated by reference in its entirety. It should be understood that any suitable type of combustor may be utilized. The fuel may be, at least in part, methane and/or oil produced by the oil well. Further, as shown, the heated nitrogen ($N_2$), which remains after separation of the oxygen from the air, is fed to a heat exchanger 38, as will be described in greater detail below.

The carbon dioxide ($CO_2$) and water combustion products pass through a turbine 42, which, like the turbine 30, is used to power an electrical generator 50 for producing usable electricity. The electrical generators 32, 50 may be used for powering compressors of the system, lights at the site, etc. The turbine 42 also drives an air compressor 40 for bringing air into the system. This air is passed to one side of a heat exchanger 44, and the $CO_2$ and water combustion products are passed to the other side, thus heating the air, which is used as the pre-heated air for the oxy-fuel combustor 36 and cooling the combustion products. The cooled water and $CO_2$ may then be separated in a separator 46 through condensation of the cooled water.

The separated water, as shown, then passes through heat exchanger 38, where heat from the heated, separated $N_2$ gas is used to heat the water, which is then stored in the water storage tank 20 for use in the steam injection enhanced oil recovery of the daytime portion. The separated $CO_2$ is fed into the oil field 102 through a carbon dioxide pipe 34 (via compressor 48) for miscible enhanced oil recovery in the oil field 102. The nitrogen gas exiting the heat exchanger 38 may be injected into the oil field 102 through a nitrogen pipe 28 for immiscible enhanced oil recovery. The oil driven by both the miscible enhanced oil recovery (via the injected $CO_2$) and the immiscible enhanced oil recovery (via the injected $N_2$) is extracted through the oil and water pipe 22. Gaseous carbon dioxide may be diverted therefrom and may be recycled, via compressor 24, feeding back to be mixed with the fuel before entering the oxy-fuel combustor 36 for recycling of the carbon dioxide and diluting the oxy-combustion with carbon dioxide instead of $N_2$ in the case of air combustion.

It is to be understood that the present invention is not limited to the embodiments described above, but encompasses any and all embodiments within the scope of the following claims.

We claim:

1. A hybrid solar thermal enhanced oil recovery system with an oxy-fuel combustor, comprising:

a solar heater for receiving a first portion of production water and producing steam therefrom;

a steam pipe in fluid communication with the solar heater for receiving and injecting the steam into an oil field having an oil well;

an oil and water pipe outputting a mixture of oil and water from the oil well;

an oil and water separator in communication with the oil and water pipe for separating oil and the production water from the mixture of oil and water, the oil and water separator being in further communication with the solar heater for feeding the first portion of the production water thereto;

an oxy-fuel combustor for receiving fuel and pre-heated air, the oxy-fuel combustor having an ion transport membrane for separating oxygen from the preheated air and a combustion chamber for combustion of the oxygen with the fuel, the combustion producing heated carbon dioxide gas and combustion product water;

an air compressor for receiving ambient air and outputting compressed air;

a first heat exchanger for receiving the heated carbon dioxide gas, the combustion product water and the compressed air, the first heat exchanger heating the compressed air to produce the pre-heated air for the oxy-fuel combustor and further outputting cooled carbon dioxide gas and cooled water;

a water and gas separator for separating the cooled carbon dioxide gas and the cooled water; and a carbon dioxide pipe in fluid communication with the water and gas separator for injecting the cooled carbon dioxide into the oil field.

2. The hybrid solar thermal enhanced oil recovery system as recited in claim 1, further comprising a water storage tank for receiving and storing a second portion of the production water produced by said oil and water separator, the water storage tank further being in communication with said water and gas separator.

3. The hybrid solar thermal enhanced oil recovery system as recited in claim 2, further comprising a first pump connected to the water storage tank for selectively injecting injection water from the water storage tank into the steam pipe with the steam.

4. The hybrid solar thermal enhanced oil recovery system as recited in claim 3, further comprising a second pump connected to the water storage tank for selectively mixing a volume of stored water from the water storage tank with make-up water from an external make-up water source prior to delivery to said solar heater.

5. The hybrid solar thermal enhanced oil recovery system as recited in claim 4, further comprising:
a first turbine driven by the steam prior to the injection thereof into said steam pipe; and
a first electrical generator driven by the first turbine for producing electrical energy.

6. The hybrid solar thermal enhanced oil recovery system as recited in claim 1, further comprising:
a second turbine driven by the heated carbon dioxide gas and the combustion product water prior to the injection thereof into said first heat exchanger; and
a second electrical generator driven by the second turbine for producing electrical energy.

7. The hybrid solar thermal enhanced oil recovery system as recited in claim 6, wherein the second turbine mechanically drives said air compressor.

8. The hybrid solar thermal enhanced oil recovery system as recited in claim 1, further comprising a first carbon dioxide compressor in communication with said water and gas separator for receiving the cooled carbon dioxide and injecting the cooled carbon dioxide into the carbon dioxide pipe.

9. The hybrid solar thermal enhanced oil recovery system as recited in claim 8, further comprising a second carbon dioxide compressor connected to the oil and water pipe for receiving output carbon dioxide from the oil and water pipe and recycling the output carbon dioxide by mixture thereof with the fuel before delivery thereof to the oxy-fuel combustor.

10. The hybrid solar thermal enhanced oil recovery system as recited in claim 1, further comprising a second heat exchanger in fluid communication with said oxy-fuel combustor and said water and gas separator for receiving heated nitrogen gas and the cooled water.

11. The hybrid solar thermal enhanced oil recovery system as recited in claim 10, further comprising a nitrogen pipe in communication with the second heat exchanger for receiving output nitrogen gas therefrom and injecting the output nitrogen gas into the oil field.

12. A hybrid solar thermal enhanced oil recovery system with an oxy-fuel combustor, comprising:
a solar heater for receiving a first portion of production water and producing steam therefrom;
a steam pipe in fluid communication with the solar heater for receiving and injecting the steam into an oil field having an oil well;
an oil and water pipe outputting a mixture of oil and water from the oil well;
an oil and water separator in communication with the oil and water pipe for separating oil and the production water from the mixture of oil and water, the oil and water separator being in further communication with the solar heater for feeding the first portion of the production water thereto;
an oxy-fuel combustor for receiving fuel and pre-heated air, the oxy-fuel combustor having means for separating oxygen from the pre-heated air and means for combusting the oxygen with the fuel, thereby producing heated carbon dioxide gas and combustion product water;
an air compressor for receiving ambient air and outputting compressed air;
a first heat exchanger for receiving the heated carbon dioxide gas, the combustion product water and the compressed air, the first heat exchanger heating the compressed air to produce the pre-heated air for the oxy-fuel combustor and further outputting cooled carbon dioxide gas and cooled water;
a water and gas separator for separating the cooled carbon dioxide gas and the cooled water;
a carbon dioxide pipe in fluid communication with the water and gas separator for injecting the cooled carbon dioxide into the oil field;
a second heat exchanger in fluid communication with the oxy-fuel combustor and the water and gas separator for receiving heated nitrogen gas and the cooled water; and
a nitrogen pipe in communication with the second heat exchanger for receiving output nitrogen gas therefrom and injecting the output nitrogen gas into the oil field.

13. The hybrid solar thermal enhanced oil recovery system as recited in claim 12, further comprising a water storage tank for receiving and storing a second portion of the production water produced by said oil and water separator, the water storage tank being in further communication with said water and gas separator.

14. The hybrid solar thermal enhanced oil recovery system as recited in claim 13, further comprising a first pump connected to the water storage tank for selectively injecting injection water from the water storage tank into the steam pipe with the steam.

15. The hybrid solar thermal enhanced oil recovery system as recited in claim 14, further comprising a second pump connected to the water storage tank for selectively mixing a volume of stored water from the water storage tank with make-up water from an external make-up water source prior to delivery to said solar heater.

16. The hybrid solar thermal enhanced oil recovery system as recited in claim 15, further comprising:

a first turbine driven by the steam prior to the injection thereof into said steam pipe; and a first electrical generator driven by the first turbine for producing electrical energy.

17. The hybrid solar thermal enhanced oil recovery system as recited in claim 16, further comprising:

a second turbine driven by the heated carbon dioxide gas and the combustion product water prior to the injection thereof into said first heat exchanger; and a second electrical generator driven by the second turbine for producing electrical energy.

18. The hybrid solar thermal enhanced oil recovery system as recited in claim 17, wherein the second turbine mechanically drives said air compressor.

19. The hybrid solar thermal enhanced oil recovery system as recited in claim 18, further comprising a first carbon dioxide compressor in communication with said water and gas separator for receiving the cooled carbon dioxide and injecting the cooled carbon dioxide into the carbon dioxide pipe.

20. The hybrid solar thermal enhanced oil recovery system as recited in claim 19, further comprising a second carbon dioxide compressor for receiving output carbon dioxide from the oil and water pipe and recycling the output carbon dioxide by mixture thereof with the fuel before delivery thereof to the oxy-fuel combustor.

* * * * *